United States Patent
Misaki (10) Patent No.: US 11,535,172 B2
(45) Date of Patent: Dec. 27, 2022

(54) WORK VEHICLE

(71) Applicant: KUBOTA CORPORATION, Osaka (JP)

(72) Inventor: Shinji Misaki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/836,096

(22) Filed: Jun. 9, 2022

(65) Prior Publication Data

US 2022/0297614 A1 Sep. 22, 2022

Related U.S. Application Data (63) Continuation of application No. 17/046,316, filed as application No. PCT/JP2019/049374 on Dec. 17, 2019, now Pat. No. 11,383,655.

(30) Foreign Application Priority Data

Dec. 20, 2018 (JP) .................................. 2018-238888

(51) Int. Cl.
| | |
|---|---|
| *B60R 11/02* | (2006.01) |
| *B60R 1/00* | (2022.01) |
| *B62D 25/04* | (2006.01) |
| *B62D 33/06* | (2006.01) |
| *B60R 11/00* | (2006.01) |

(52) U.S. Cl.
CPC .......... *B60R 11/0258* (2013.01); *B60R 1/006* (2013.01); *B60R 11/02* (2013.01); *B62D 25/04* (2013.01); *B62D 33/0617* (2013.01); *B60R 2011/004* (2013.01)

(58) Field of Classification Search
CPC .................................................. B60R 11/0208
USPC .................................................. 343/713, 718
See application file for complete search history.

(56) References Cited

FOREIGN PATENT DOCUMENTS

| JP | 2018-129654 A | 8/2018 |
|---|---|---|
| RU | 2 165 595 C1 | 4/2001 |
| WO | 2018/147151 A1 | 8/2018 |

OTHER PUBLICATIONS

Misaki, "Work Vehicle", U.S. Appl. No. 17/046,316, filed Oct. 9, 2020.
Official Communication issued in corresponding European Patent Application No. 19897646.6, dated Aug. 2, 2022.

*Primary Examiner* — Dennis H Pedder
(74) *Attorney, Agent, or Firm* — Keating and Bennett, LLP (57) ABSTRACT

A work vehicle includes a cabin covering a driver section, a receiver to receive positional information from a satellite, and a stay to support the receiver. The receiver is above a roof of the cabin and supported at a cabin framework of the cabin via the stay.

3 Claims, 9 Drawing Sheets

WORK VEHICLE

BACKGROUND OF THE INVENTION

1. Field of the Invention

The present invention relates to a work vehicle including a reception device to receive positional information from a satellite.

2. Description of the Related Art

As a work vehicle as described above, a work vehicle disclosed in Japanese Unexamined Patent Application Publication No. 2018-114924 is conventionally known, for example. The work vehicle disclosed in Japanese Unexamined Patent Application Publication No. 2018-114924 includes a cabin (cabin (4) in Japanese Unexamined Patent Application Publication No. 2018-114924) which covers a driver section, and a reception device (antenna unit (61) in Japanese Unexamined Patent Application Publication No. 2018-114924) which receives positional information from a satellite. In the work vehicle disclosed in Japanese Unexamined Patent Application Publication No. 2018-114924, the reception device is attached to an upper face portion of a roof of the cabin to secure preferable receipt of the positional information from the satellite.

SUMMARY OF THE INVENTION

In the work vehicle disclosed in Japanese Unexamined Patent Application Publication No. 2018-114924, there is a need for a roof (dedicated roof) to which the reception device is attachable, and so a supporting structure of the reception device may be configured on a large scale. In such as case, since a work to form a hole in the roof is required, the cabin may have a risk of entrance of water through the hole, too.

In view of the above situation, there is a demand for a work vehicle in which the supporting structure of the reception device can be simply configured.

According to an example preferred embodiment of the present invention, a work vehicle includes a cabin covering a driver section, a receiver to receive positional information from a satellite, and a stay to support the receiver, wherein the receiver is above a roof of the cabin and supported at a cabin framework of the cabin via the stay.

With the structure described above, since the receiver is above the roof, the receiver can easily receive the positional information from the satellite. Also, since the receiver is supported at the cabin framework of the cabin via the stay, the supporting structure of the receiver is able to be simply configured without need for a roof (a dedicated roof) to which the receiver is attachable, and further the receiver is able to be securely supported by the cabin framework which has relatively high rigidity in the cabin. Still further, since work to form a hole in the roof is not required, there is no risk that water enters the cabin through the hole.

According to another example preferred embodiment of the present invention, the receiver may be above a front portion of the roof.

With the structure described above, the receiver receives the positional information on an approximately front/rear central portion of a traveling vehicle body. As a result, when the traveling vehicle body travels automatically along a target travel route, for example, less correction of the positional information received by the receiver is required.

According to still another example preferred embodiment of the present invention, the stay may include an elongated member that straddles the front portion of the roof from above in a right-left direction of the vehicle body, the receiver may be supported at the elongated member, the cabin framework may include a pair of right and left front pillars that support the front portion of the roof, a left end portion of the elongated member being supported at the left front pillar, and a right end portion of the elongated member being supported at the right front pillar.

With the structure described above, the supporting structure of the receiver is able to be configured without interference of the elongated member with the roof. Also, both the right and left end portions of the elongated member is able to be securely supported by the front pillars.

According to still another example preferred embodiment of the present invention, the left end portion of the elongated member may be fixed to a support that supports a side mirror in the left front pillar, and the right end portion of the elongated member may be fixed to the support that supports the side mirror in the right front pillar.

With the structure described above, the elongated member and the side mirror share the support. As a result, the number of parts related to the supporting structure of the receiver is able to be reduced.

According to still yet another example preferred embodiment of the present invention, the stay may include a plurality of the elongated members aligned with each other in a front-rear direction of the vehicle body, and a pedestal extending between or across the plurality of the elongated members to mount and support the receiver thereon.

With the structure described above, the receiver is supported at a plurality of the elongated members via the pedestal. As a result, the supporting structure of the receiver is able to have a rigid configuration.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described with reference to the drawings.

Figure 1:
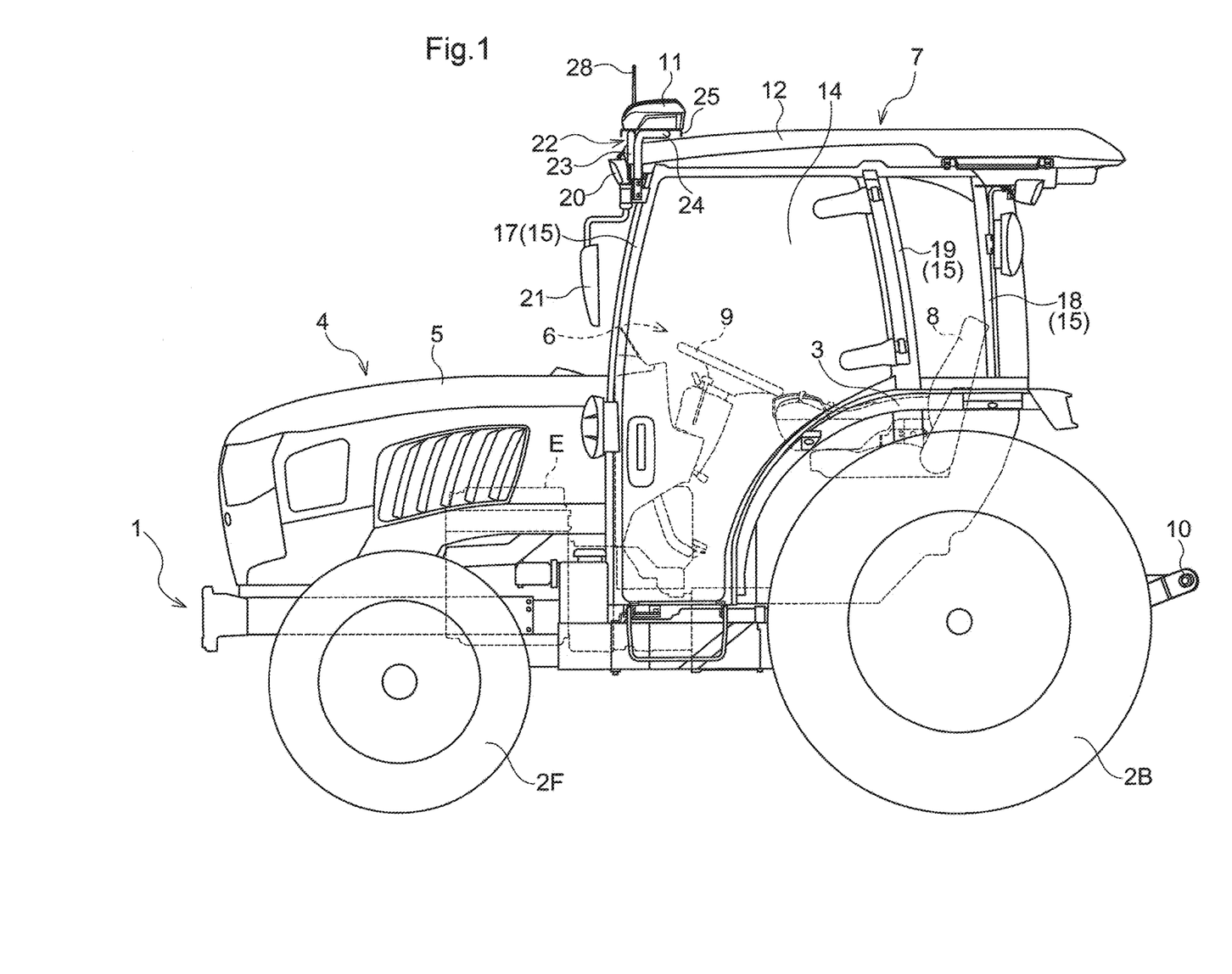
FIG. 1 is a left side view showing a tractor.
Figure 2:
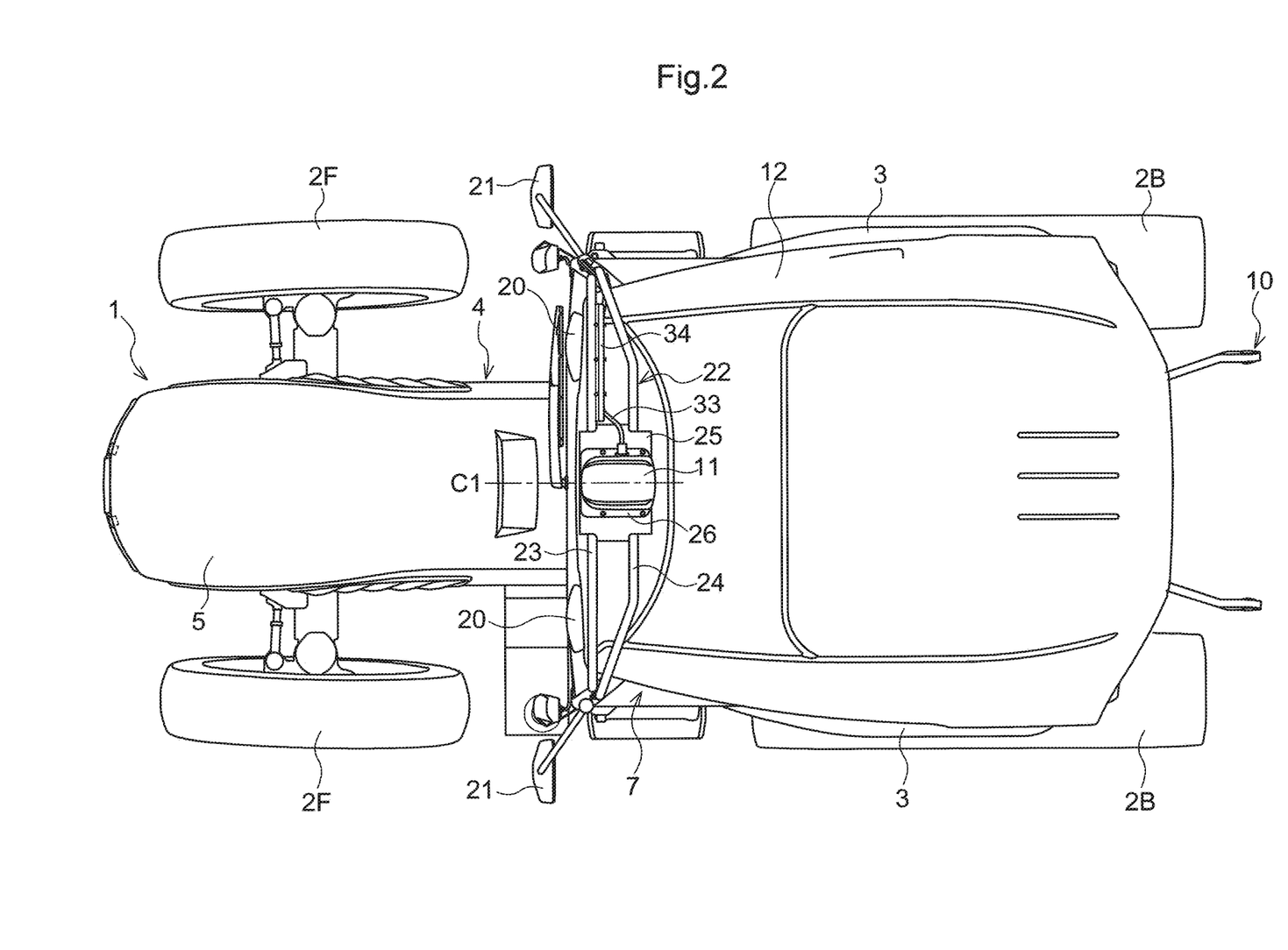
FIG. 2 is a plan view showing a tractor.
Figure 3:
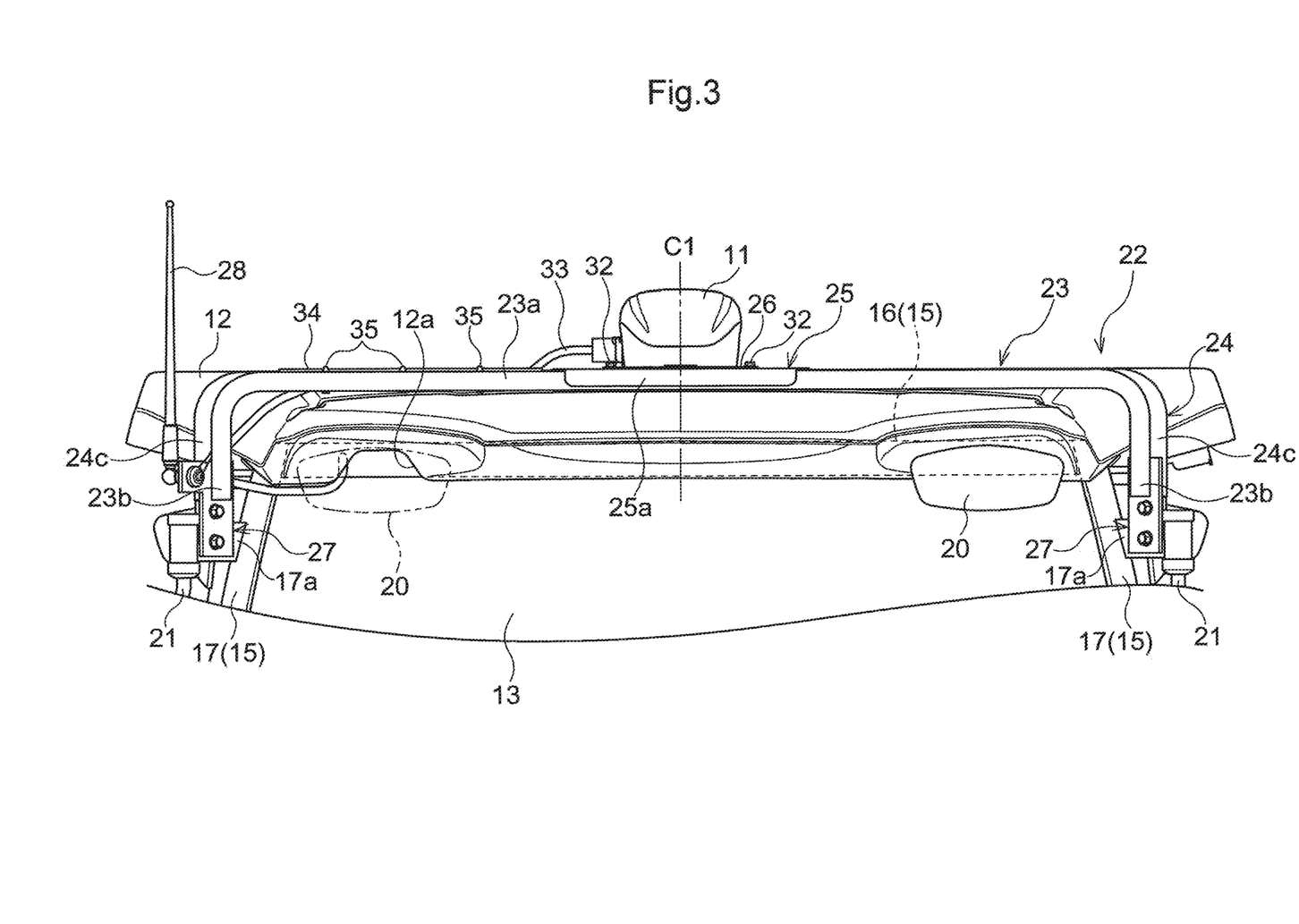
FIG. 3 is a front view showing an upper portion of a cabin.
Figure 4:
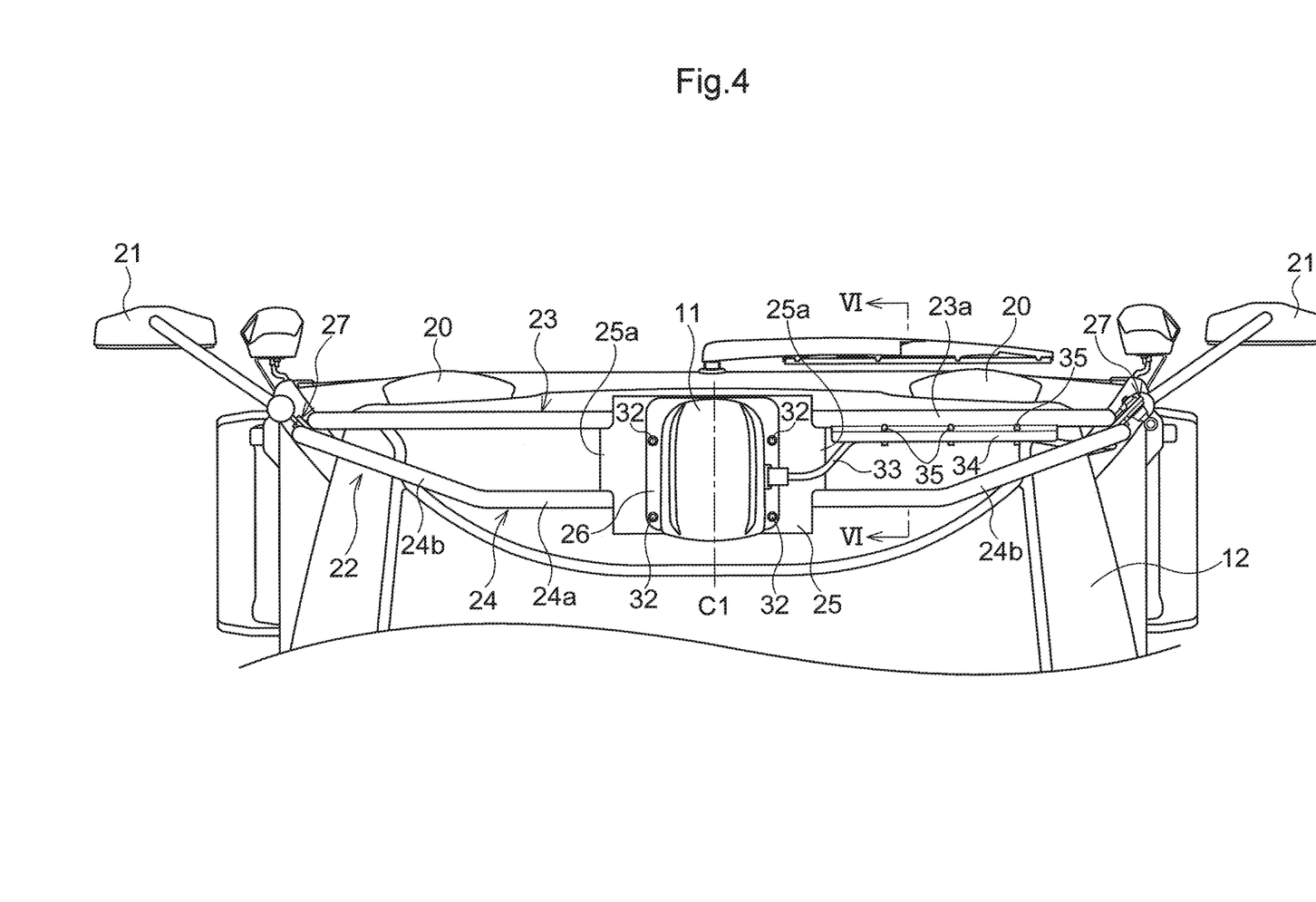
FIG. 4 is a plan view showing a front portion of a cabin.
Figure 5:
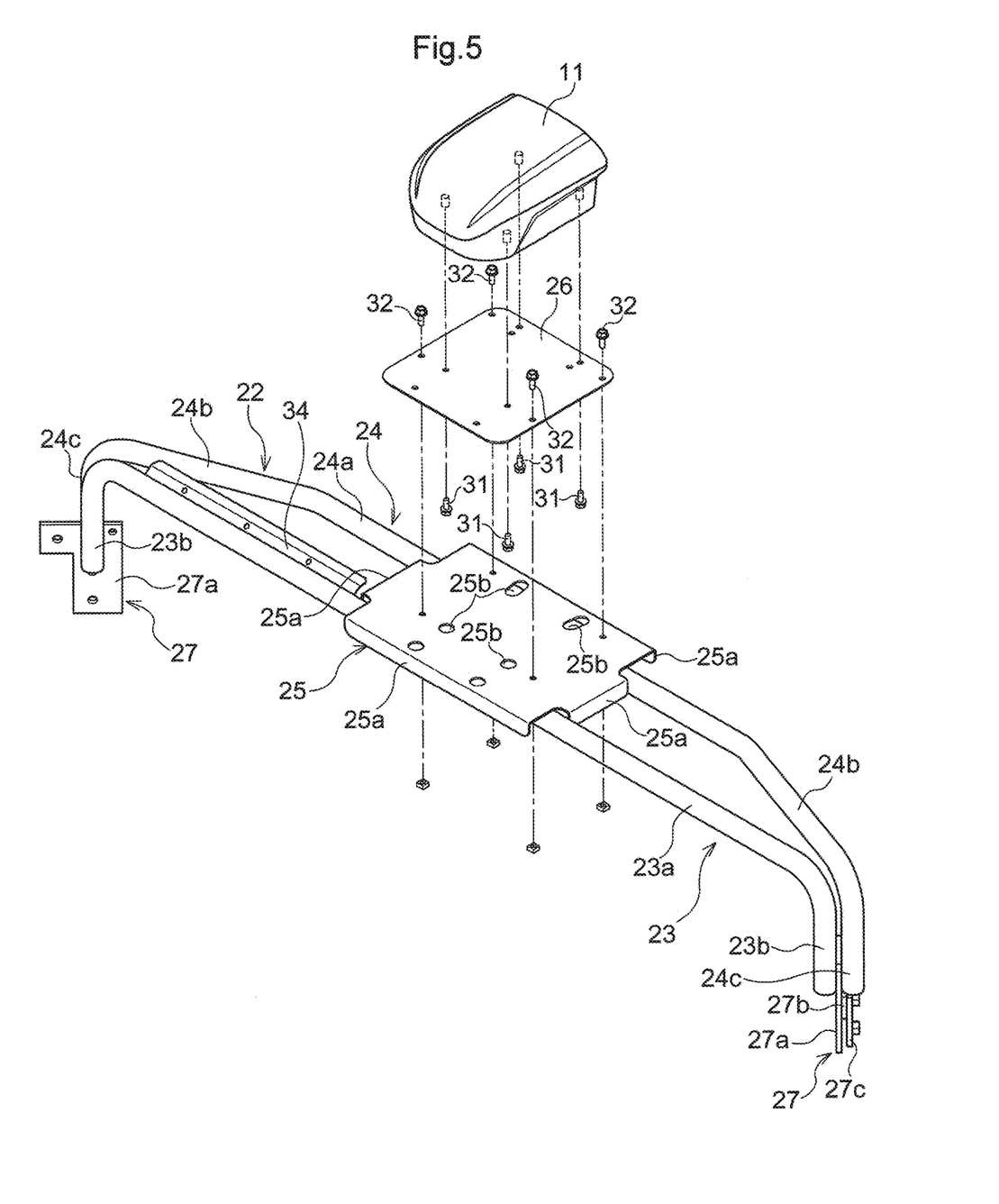
FIG. 5 is an exploded perspective view showing a supporting structure of a Global Positioning System (GPS) antenna unit.
Figure 6:
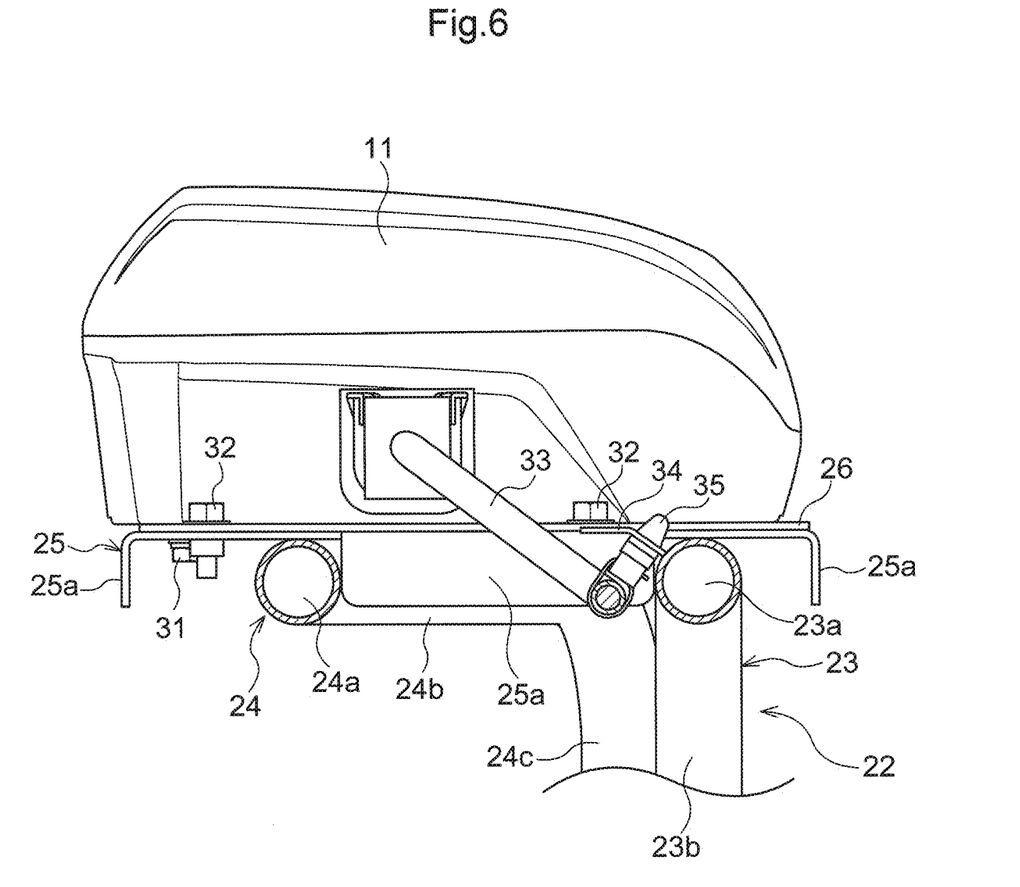
FIG. 6 is a view in section taken on VII-VII in FIG. 4.

FIG. 1 and FIG. 2 show a tractor (work vehicle). The tractor is provided with a traveling vehicle body 1. The traveling vehicle body 1 is a four-wheel-drive traveling vehicle body, for example. The traveling vehicle body 1 is provided with a pair of drivable and steerable right and left front wheels 2F, and a pair of drivable right and left rear wheels 2B. A pair of right and left fenders 3 are disposed to cover the pair of right and left rear wheels 2B, respectively.

At a front half portion of traveling vehicle body 1, there is provided an engine section 4. The engine section 4 is provided with an engine E, and a hood 5 which houses the engine E. At a rear half portion of the traveling vehicle body 1, there are provided a driver section 6 in which a driver boards, and a cabin 7 which covers the driver section 6. At the driver section 6, there are provided a driver's seat 8 on which the driver is seated, and a steering wheel 9 which is configured to steer and operate the traveling vehicle body 1. At a rear end portion of the traveling vehicle body 1, there is provided a link mechanism 10 to which an implement (not shown) such as a rotary cultivator or the like is attached.

The tractor includes a GPS antenna unit 11 (reception device or receiver) and an inertial measurement unit (not shown). The GPS antenna unit 11 receives positional information from a GPS (Global Positioning System) satellite and measures a position of the traveling vehicle body 1 based on the received positional information. The inertial measurement unit measures inertial information (such as a yaw angle, a pitch angle and a roll angle) of the traveling vehicle body 1. The tractor includes an automatic steering mechanism (not shown) which automatically steers the traveling vehicle body 1 so as to allow the traveling vehicle body 1 to travel along a target travel route based on the position of the traveling vehicle body 1 measured by the GPS antenna unit 11 and based on the inertial information of the traveling vehicle body 1 measured by the inertial measurement unit.

As shown in FIG. 1 to FIG. 4, the cabin 7 includes a roof 12, a windshield (front glass) 13, a pair of right and left boarding/alighting doors 14, and a cabin framework 15. The cabin framework 15 includes a roof frame 16 which supports the roof 12, a pair of right and left front pillars 17 which support a front portion of the roof 12, a pair of right and left rear pillars 18 which support a rear portion of the roof 12, and a pair of right and left center pillars 19 which support a front/rear intermediate portion of the roof 12. At the front portion of the roof 12, there are provided a pair of right and left work lamps 20. Each of the left front pillar 17 and the right front pillar 17 is provided with a side mirror 21. Each of the left front pillar 17 and the right front pillar 17 is also provided with a support element 17a which supports the side mirror 21 associated therewith.

As shown in FIG. 3 to FIG. 6, the GPS antenna unit 11 is arranged above a front portion of the roof 12, with a right-left center thereof being in alignment with the right-left center Cl of the vehicle body; and the GPS antenna unit is supported at the left front pillar 17 and the right front pillar 17 via a stay 22. The stay 22 is disposed between or across the left front pillar 17 and the right front pillar 17, the stay 22 straddling the front portion of the roof 12 from above in the right-left direction of the vehicle body. The stay 22 includes a front support pipe 23 (elongated member) and a rear support pipe 24 (elongated member) which straddle the front portion of the roof 12 from above in the right-left direction of the vehicle body, a pedestal 25 to mount and support the GPS antenna unit 11 thereon, and a plate 26 which is interposed between the GPS antenna unit 11 and the pedestal 25.

To the front support pipe 23 and the rear support pipe 24, the GPS antenna unit 11 is supported via the pedestal 25. A space is provided to extend from the front support pipe 23 and the rear support pipe 24 to an outer surface of the roof 12, along the entire length of each of the front support pipe 23 and the rear support pipe 24. The front support pipe 23 includes a horizontal pipe portion 23a which extends in a right-left direction of the vehicle body, a vertical pipe portion 23b which extends downward from a left end portion of the horizontal pipe portion 23a, and a vertical pipe portion 23b which extends downward from a right end portion of the horizontal pipe portion 23a. The rear support pipe 24 includes a horizontal pipe portion 24a which extends in the right-left direction of the vehicle body, an oblique pipe portion 24b which extends left forward from a left end portion of the horizontal pipe portion 24a, an oblique pipe portion 24b which extends right forward from a right end portion of the horizontal pipe portion 24a, a vertical pipe portion 24c which extends downward from a left end portion of the left inclined 24b, and a vertical pipe portion 24c which extends downward from a right end portion of the right inclined 24b.

Each of the left end portions of the front support pipe 23 and the rear support pipe 24 is bolted or fixed to a support element 17a of the left front pillar 17. In other words, each of the left end portions of the front support pipe 23 and the rear support pipe 24 is supported at the support element 17a of the left front pillar 17. Between or across the left end portion of the front support pipe 23 and the left end portion of the rear support pipe 24, there is provided a fixed portion 27 which is fixed to the support element 17a of the left front pillar 17.

Each of the right end portions of the front support pipe 23 and the rear support pipe 24 is bolted or fixed to the support element 17a of the right front pillar 17. In other words, each of the right end portions of the front support pipe 23 and the rear support pipe 24 is supported at the support element 17a of the right front pillar 17. Between or across the right end portion of the front support pipe 23 and the right end portion of the rear support pipe 24, there is provided the fixed portion 27 which is fixed to the support element 17a of the right front pillar 17.

Figure 7:
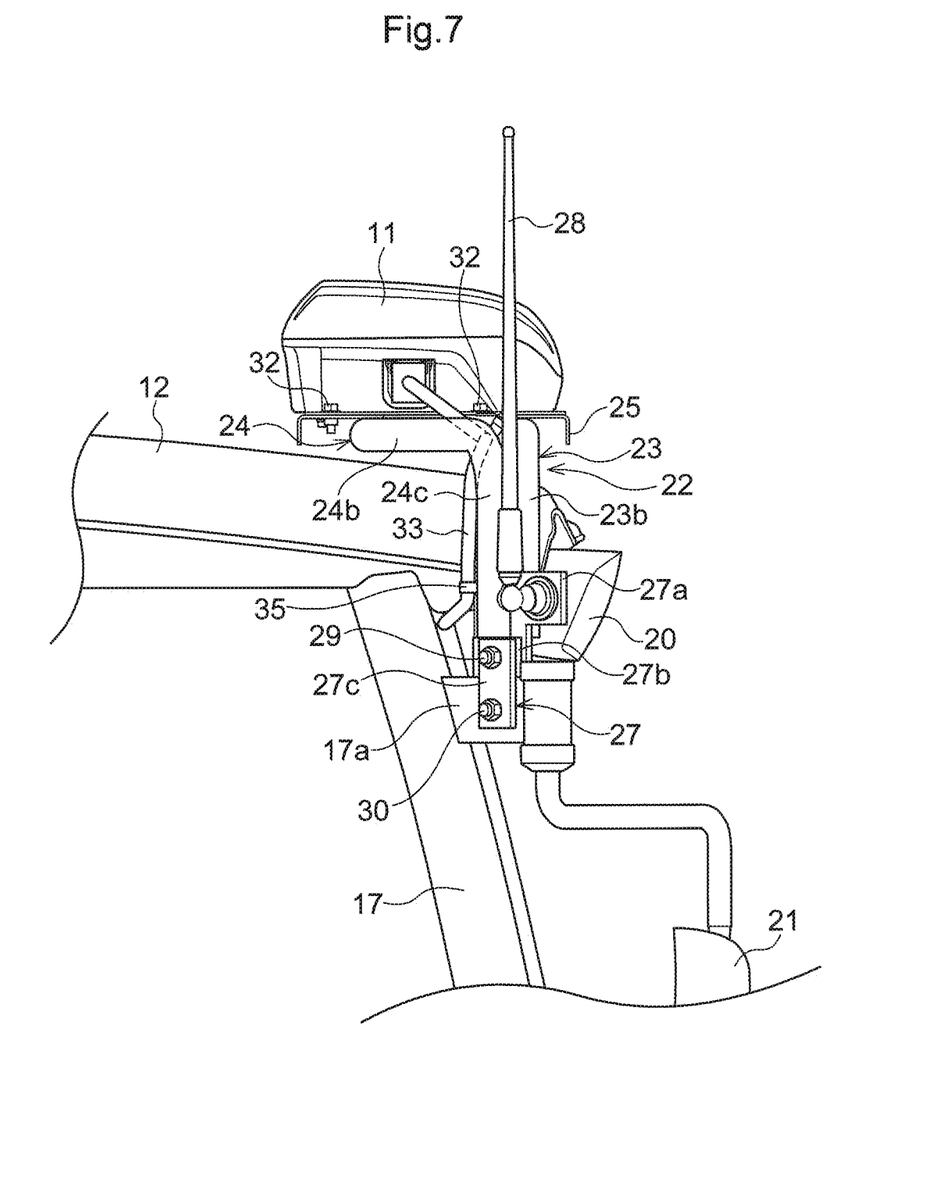
FIG. 7 is a right side view showing a condition of a right end portion of a stay being supported at a support element.
Figure 8:
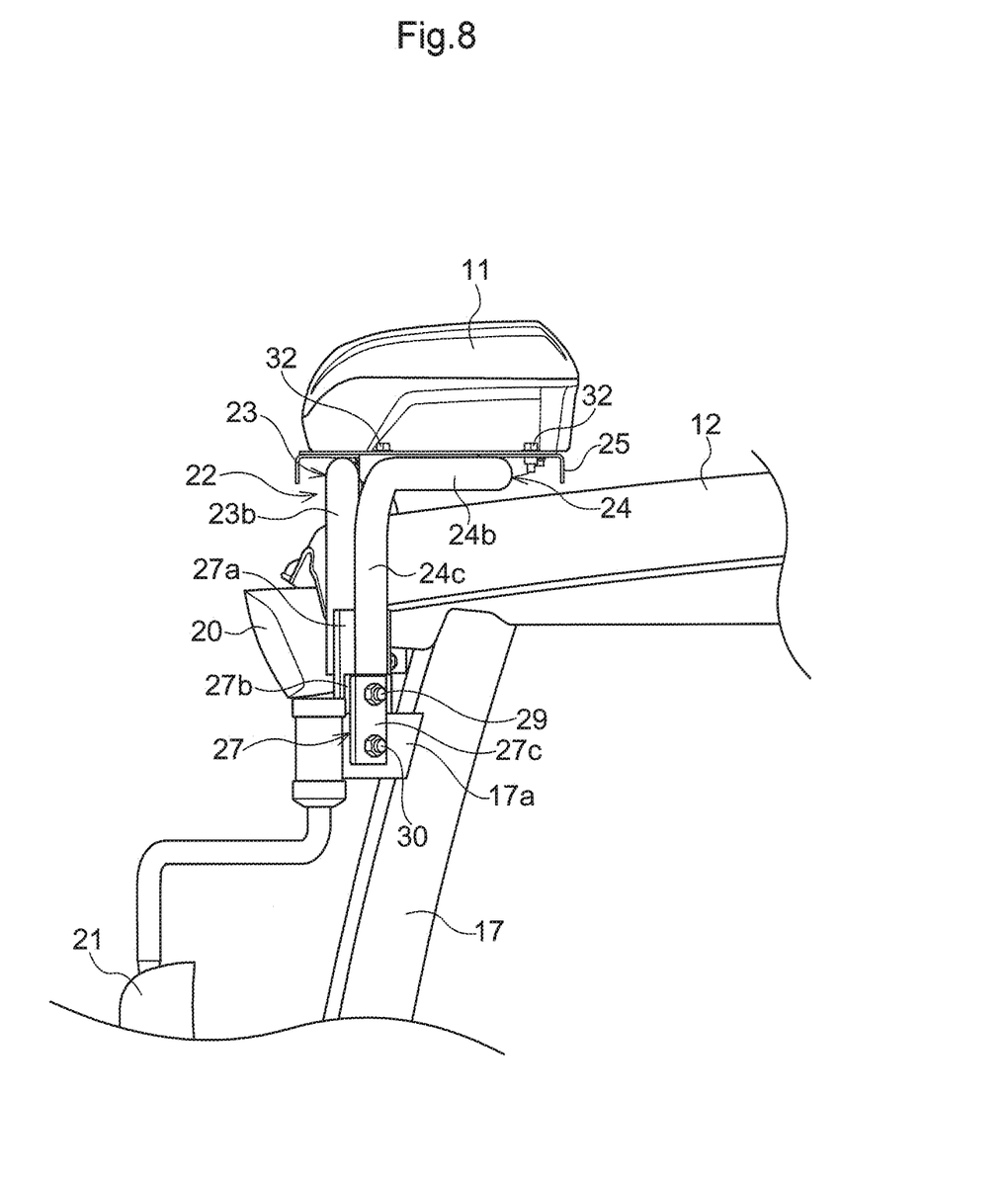
FIG. 8 is a left side view showing a condition of a left end portion of the stay being supported at a support element.
Figure 9:
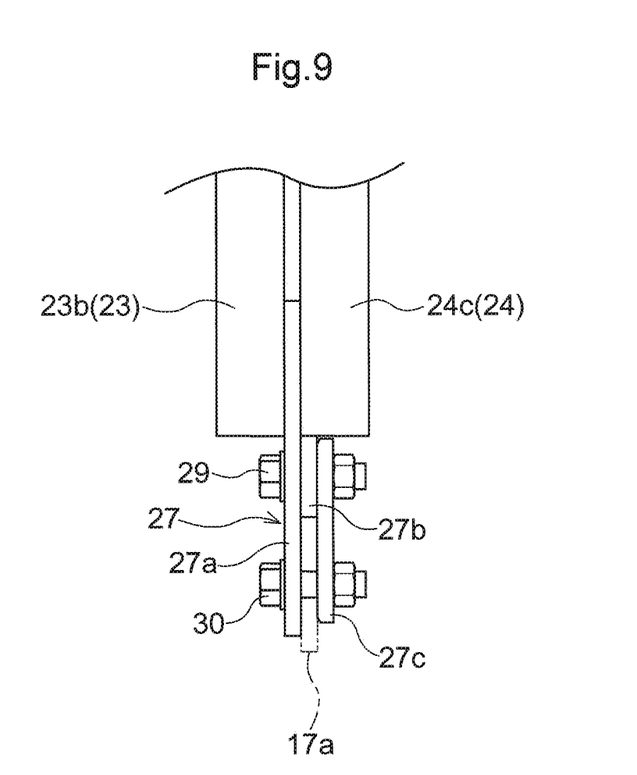
FIG. 9 is a view showing a fixed portion.

As shown in FIG. 7 through FIG. 9, the fixed portion 27 includes a first board 27a, a second board 27b and a third board 27c. In the right fixed portion 27, a radio antenna 28 is attached to the first board 27a. The second board 27b abuts against the support element 17a from above. Also, with the first board 27a and a third board 27c clamping the support element 17a from opposed sides, the first board 27a, the second board 27b and the third board 27c are fixed by a bolt 29, and the first board 27a, the third board 27c and the support element 17a are fixed by a bolt 30. Abutting the second board 27b against the support element 17a from above determines a height position of the stay 22.

As shown in FIG. 3 through FIG. 6, the pedestal 25 is disposed between or across the front support pipe 23 and the rear support pipe 24. To the pedestal 25, the GPS antenna unit 11 is supported and mounted via a plate 26. In the pedestal 25, bent portions 25a which are bent downward are respectively provided at a front edge portion, a rear edge portion, a left edge portion and a right edge portion. Fitting the left bent portion 25a and the right bent portion 25a into between the front support pipe 23 and the rear support pipe 24 determines a front-rear position of the pedestal 25.

The plate 26 is fixed to a bottom surface portion of the GPS antenna unit 11 by bolts 31 penetrating through the plate 26 from below, and is fixed to the pedestal 25 by bolts 32 penetrating through the plate 26 and the pedestal 25 from above. In order to prevent interference of a head portion of each bolt 31 with the pedestal 25, an escape hole 25b is provided to relieve the head portion of the bolt 31.

A harness 33 for the GPS antenna unit 11 extends between or across the GPS antenna unit 11 and a controller (not shown) which controls the automatic steering mechanism and the like. The harness 33 is routed along an outer periphery of a right-side portion of the front support pipe 23, the harness 33 being drawn out from a right-side portion of the GPS antenna unit 11 to a right side. The harness 33 extends from a recessed portion 12a in the front edge portion of the roof 12 associated with the right work lamp 20, penetrates through the front edge portion of the roof frame 16, and extends to the interior of the roof 12. On the right-side portion of the front support pipe 23, there is provided a cover 34 which covers the harness 33. The harness 33 is fixed to the cover 34 and to the first board 27a of the right fixed portion 27 by a fixing tool 35.

In the foregoing preferred embodiments, the GPS antenna unit 11 is preferably positioned above the front portion of the roof 12. However, the GPS antenna unit 11 may be positioned above a rear portion of the roof 12. Alternatively, the GPS antenna unit 11 may be positioned above a front-rear intermediate portion of the roof 12.

In the foregoing preferred embodiments, the harness 33 is routed along the outer periphery of the right-side portion of the front support pipe 23. However, the harness 33 may be routed along the outer periphery of the right-side portion of the rear support pipe 24. Alternatively, the harness 33 may be extended through the interior of the right-side portion of the front support pipe 23. Still alternatively, the harness 33 may be extended through the interior of the right-side portion of the rear support pipe 24.

In the foregoing preferred embodiments, the harness 33 is drawn out from the right-side portion of the GPS antenna unit 11 to the right side. However, the harness 33 may be drawn out from a left-side portion of the GPS antenna unit 11 to a left side.

In this case, the harness 33 may be routed along the outer periphery of a left-side portion of the front support pipe 23. Alternatively, the harness 33 may be routed along the outer periphery of the left-side portion of the rear support pipe 24. Still alternatively, the harness 33 may be extended through the interior of the left-side portion of the front support pipe 23. Still yet alternatively, the harness 33 may be extended through the interior of the left-side portion of the rear support pipe 24.

In the foregoing preferred embodiments, the left end portions of the front support pipe 23 and the rear support pipe 24 are respectively supported at the support element 17a of the left front pillar 17, and the right end portions of the front support pipe 23 and the rear support pipe 24 are respectively supported at the support element 17a of the right front pillar 17. However, the left end portions of the front support pipe 23 and the rear support pipe 24 may be respectively supported at other portions than the support element 17a of the left front pillar 17, and the right end portions of the front support pipe 23 and the rear support pipe 24 may be respectively supported at other portions than the support element 17a of the right front pillar 17. Alternatively, the left end portions of the front support pipe 23 and the rear support pipe 24 may be respectively supported at other portions than the left front pillar 17 in the cabin framework 15, and the right end portions of the front support pipe 23 and the rear support pipe 24 may be respectively supported at portions other than the right front pillar 17 in the cabin framework 15.

The "elongated member" is not limited to two pipes, i.e., the front support pipe 23 and the rear support pipe 24. The "elongated member" may be a single pipe, or three pipes or more.

Preferred embodiments of the present invention are applicable to a work vehicle (e.g. tractor) including a reception device that receives positional information from a satellite.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
a cabin covering a driver section;
a receiver to receive positional information from a satellite; and
a stay to support the receiver; wherein
the receiver is above a roof of the cabin and supported at a cabin framework of the cabin via the stay;
the stay includes at least one elongated member straddling a front portion of the roof from above in a right-left direction of a vehicle body and supporting the receiver;
the cabin framework includes a pair of right and left front pillars supporting the front portion of the roof;
a left end portion of the at least one elongated member is fixed to a left support to support a left side mirror in the left front pillar, and the at least one elongated member includes a left fixed portion including two boards that clamp the left support; and
a right end portion of the at least one elongated member is fixed to a right support to support a right side mirror in the right front pillar, and the at least one elongated member includes a right fixed portion including two boards that clamp the right support.

2. The work vehicle according to claim 1, wherein the receiver is above the front portion of the roof.

3. The work vehicle according to claim 1, wherein the at least one elongated member includes a plurality of elongated members aligned with each other in a front-rear direction of the vehicle body; and
the stay includes a pedestal extending between or across the plurality of the elongated members to mount and support the receiver thereon.

* * * * *